United States Patent [19]

Bertrand

[11] Patent Number: 4,638,015

[45] Date of Patent: Jan. 20, 1987

[54] EXPANDED POLYPROPYLENE FILMS

[75] Inventor: Jean-Noel M. Bertrand, Wezembeek-Oppem, Belgium

[73] Assignee: Montefina, S.A., Brussels, Belgium

[21] Appl. No.: 782,797

[22] Filed: Sep. 30, 1985

[30] Foreign Application Priority Data

Oct. 8, 1984 [LU] Luxembourg .................... 85577

[51] Int. Cl.$^4$ ............................................. C08J 9/08
[52] U.S. Cl. ...................................... 521/85; 521/86; 521/88; 521/91; 521/143; 521/144; 521/908; 521/79; 525/240
[58] Field of Search ................. 521/79, 85, 88, 91, 521/97, 908, 143, 144; 525/240

[56] References Cited

U.S. PATENT DOCUMENTS

| | | | |
|---|---|---|---|
| 3,207,739 | 9/1965 | Wales | 525/240 |
| 3,268,499 | 8/1966 | Wales | 525/240 |
| 3,725,317 | 4/1973 | Roden | 521/79 |
| 3,808,300 | 4/1974 | Miyamoto et al. | 521/79 |
| 3,839,238 | 10/1974 | Ealding | 521/79 |
| 3,962,154 | 6/1976 | Elgi | 521/79 |
| 4,407,768 | 10/1983 | Garcia | 521/79 |

OTHER PUBLICATIONS

Kuhre et al., "Crystallization-Modified Polypropylene", SPE Journal, Oct., 1964, pp. 1113–1119.

*Primary Examiner*—Morton Foelak
*Attorney, Agent, or Firm*—John K. Abokhair; M. Norwood Cheairs

[57] ABSTRACT

Disclosed are films made of expanded polypropylene, which have a uniform specific gravity d of from about $4.25 \times 10^{-6}$ to about $6.50 \times 10^{-6}$ Newton/mm$^3$, a crystallization temperature of from about 115° C. to about 135° C. and an elastic modulus Me expressed in Newton/mm$^3$ such that the ratio Me:d is from about $1.6 \times 10^8$ to about $2.0 \times 10^8$ mm.

13 Claims, No Drawings

EXPANDED POLYPROPYLENE FILMS

FIELD OF THE INVENTION

The present invention relates to improved expanded polypropylene films. More particularly, the present invention relates to films made of expanded crystalline polypropylene. Additionally, the present invention provides a process for making films of expanded polypropylene having improved physical properties.

BACKGROUND OF THE INVENTION

The term "film", as used herein, means flexible paper like material made from plastics and particularly from polypropylene. Films usually have a thickness not greater than 0.2 millimeters (mm). These materials are used as paper substitutes particularly in the packaging area, for example, inside candy boxes. This material can even be thermoformed into wrappings for individual candy pieces. Films should be distinguished from rigid articles such as sheets, tubes, boards and plates. These films are smoother to the touch than paper equivalents.

Expanded polypropylene offers numerous advantages over non-expanded polypropylene. Objects made of expanded polypropylene exhibit a weight advantage of up to 25% over articles made of non-expanded polypropylene. It is easier to print on expanded polypropylene without having to pretreat the receiving surface as would be required with non-expanded polypropylene.

The art does not provide a method to obtain films, having good physical characteristics, from expanded polypropylene without the addition of significant amounts of polystyrene, polybutadiene and the like. Even with the utilization of highly specialized and specific processes, blowing agents and other additives, the heretofore known conventional processes for forming expanded polypropylene produce cells of uneven structure and give surface irregularities and poor appearance to the resulting film, thereby yielding products of reduced commercial value.

Additionally, previously known methods for producing expanded polypropylene films have certain disadvantages. For example, such films have poor mechanical strength, and more particularly poor tensile strength. Moreover, the specific gravity or density of such films is not always homogeneous. Thus, the films may contain density variations that may reach about 10%.

SUMMARY OF THE INVENTION

An object of the present invention is to provide expanded polypropylene films, the mechanical properties of which are improved.

Another object of the present invention is to provide expanded polypropylene films which have a high crystallization temperature.

Still another object of the present invention is to provide expanded crystalline polypropylene films having a uniform specific gravity.

In accomplishing the foregoing objects, there is provided films made of expanded polypropylene and characterized by having (i) a uniform specific gravity d of from about $4.25 \times 10^{-6}$ to about $6.50 \times 10^{-6}$ Newton/mm$^3$, (ii) a crystallization temperature of from about 115° to about 135° C., and (iii) an elastic modulus Me expressed in Newton/mm$^2$ such that the ratio Me:d is from about $1.6 \times 10^8$ to about $2.0 \times 10^8$ mm.

The films of the present invention may be obtained from a composition which essentially comprises isotactic polypropylene, an agent which increases the crystallization speed, a blowing agent and optionally a nucleating agent which is active at the expansion level.

DETAILED DESCRIPTION OF THE PREFERRED EMBODIMENTS

While the films of the present invention may be prepared from a copolymer of propylene and a minor amount (i.e., not greater than 10 wt. %) of an alpha-olefin which may have up to 6 carbon atoms, it is preferable to use an isotactic polypropylene homopolymer, the articles obtained from said homopolymer having better physical properties. In order to increase the number of crystallization nuclei in the polypropylene, an agent which modifies and increases the crystallization speed is introduced and dispersed in the polymer. This agent is generally used in an amount from about 500 ppm to about 5000 ppm, based on the weight of polymer. Examples of agents improving the crystallization speed include dibenzilidene sorbitol, sodium bis(4-tert-butylphenol)phosphate, sodium benzoate or still a mixture comprising a monocarboxylic aromatic acid or a polycarboxylic aliphatic acid and a silicate or an aluminosilicate of a metal of Group I or II of the Periodic System. This type of crystallization agent is described in European Patent Application No. 85,968 filed in the name of the Assignee and published on Aug. 17, 1983 which is hereby incorporated by reference in its entirety.

The blowing agent may be of the type generally used for the production of expanded polypropylene. Examples of such include citric acid, mixtures of citric acid and bicarbonate of alkali metal or ammonium, azodicarbonamide, diazoaminobenzene, azo-bis-isobutyronitrile, inert gases and analogs. The blowing agent may comprise one or more additives as for instance an agent reducing its decomposition temperature.

The amount of blowing agent to be used depends on its nature and on the desired density for the expanded polypropylene. Said amount is generally from about 0.2 to about 0.7 parts per 100 parts by weight of polymer, and the proper amount can easily be determined by those skilled in the art. However, it has been noted that, with the same amount of blowing agent, the density of a film of the present invention is lower than that of a similar material obtained from polypropylene which does not contain any agent improving the crystallization speed.

In order to reduce the mean size of the cells formed in the expanded polypropylene, it may be advantageous to additionally incorporate a nucleating agent into the polymer, said nucleating agent acting at the expansion level. Generally, such an agent would consist essentially of a solid inorganic matter which is finely divided. Due to said additive, the blowing agent forms cells which are finely and uniformly dispersed within the polymer.

The compositions may also contain the usual additives, as for instance, coloring and/or drying agents, fire-proofing agents, antioxidants and/or antistatic agents.

These compositions allow the preparation, by means of usual processes well known to those skilled in the art, films the density of which is from about $4.25 \times 10^{-6}$ to about $6.50 \times 10^{-6}$ Newton/mm$^3$, depending on the amount of blowing agent used. It has been noted that the films obtained have a uniform density, the variations from any point of the material to another not exceeding about 2 to 3%. These films preferably have a thickness of from about 50 to about 200 microns.

The films of the present invention made of expanded crystalline polypropylene are also characterized by a high crystallization rate, which results from a high crystallization speed. This property is determined by measuring the crystallization temperature, which is in fact the temperature at which the crystallization speed is maximum. This measurement is carried out by using the DSC method (differential scanning calorimetry). To this end, the material to be examined is heated up to about 180° C., and thereafter cooled down. At the beginning, release of the calories follows a regular pattern, and when crystallization appears again, the amount of calories liberated increases. The temperature at which this liberation of calories is maximum is called the crystallization temperature. The materials of the present invention have a crystallization temperature of from about 115° C. to about 135° C., and preferably from about 115° C. to about 130° C. This temperature is affected by the crystallization speed modifying agent used, and by the cooling speed adopted (5° to 20° C./min).

Another particularly desirable property of the films of the invention is their improved mechanical strength. In particular, comparative trials have shown that said films have an elastic modulus at least 20% higher than that of films having the same density and obtained from polypropylene which does not contain an agent improving the speed of crystallization. Since the elastic modulus depends on the density, the films of the invention are characterized by the ratio of the elastic modulus of a film (expressed in $N.mm^{-2}$) to its density (expressed in $N.mm^{-3}$). This ratio is generally from about $1.6 \times 10^8$ to about $2.0 \times 10^8$ mm. Likewise, tensile strength at 5% elongation and tensile strength at break are higher with the films of the invention. Using films having a density of the order of $4.5 \times 10^{-6}$ to $4.7 \times 10^{-6}$ $N.mm^{-3}$, such density being most common for these materials, the tensile strength of the film at 5% elongation is of the order of 10.75 to 11.25 $N.mm^2$, while the tensile strength of break varies between 11 and 11.5 $N.mm^{-2}$. The measurements were carried out using ASTM D888-A standard.

These features and characteristics of the films of the invention are better illustrated in the following examples which are meant to illustrate the present invention and not set any limits thereon.

EXAMPLE 1

Expanded polypropylene films were prepared from polypropylene and 0.5% by weight of a mixture of (i) 5 parts by weight of citric acid and (ii) 3 parts by weight of sodium bicarbonate as blowing agent.

Several grades of polypropylene were used, namely:

isotactic polypropylene, containing no agent improving the crystallization speed, called polypropylene P1;

polypropylene obtained by mixing P1 with 0.3% by weight of a mixture of (i) 1 part by weight of adipic acid and (ii) 3 parts by weight of zeolite A4, this improved polypropylene was designated as P2;

polypropylene obtained by mixing P1 with 0.3% by weight of dibenzylidene sorbitol, this mixture was designated as P3;

polypropylene obtained by mixing P1 with 0.3% by weight of sodium bis(4-tert-butylphenol) phosphate, this mixture was designated as P4.

Polypropylene P1 is outside the scope of the present invention and it utilized for comparative purposes.

The crystallization temperature of these different grades of polypropylene was determined by heating to a temperature of 180° C., then cooling down. For some, the determination was carried out at different cooling rates. The results obtained are reported in Table I.

TABLE I

| Polypropylene Grade | Cooling Rate (°C./min) | Crystallization Temperature (°C.) |
| --- | --- | --- |
| P1 | 20 | 103.7 |
|  | 10 | 108.2 |
|  | 5 | 112.1 |
| P2 | 20 | 122.1 |
|  | 10 | 127.4 |
|  | 5 | 130.7 |
| P3 | 20 | 115.8 |
| P4 | 20 | 122.7 |

Films having a thickness of about 0.2 mm were prepared by the blown film technique. Various compositions were used, each containing one of the above-mentioned polypropylenes P1 to P4, and the amount of blowing agent was varied according to the grade of polypropylene used in order to obtain films having a density of $4.61 \times 10^{-6}$ $N.mm^{-3}$.

The elastic modulus was determined according to ASTM D.882-A. The tensile strength at 5% elongation, the tensile strength at break and the elongation at break were also determined. The results are reported in Table II.

TABLE II

| Polypropylene Grade | P1 | P2 | P3 | P4 |
| --- | --- | --- | --- | --- |
| Density ($10^{-6}$ $N/mm^3$) | 4.61 | 4.61 | 4.61 | 4.61 |
| Tensile Strength at 5% elongation (newton/$mm^2$) | 9.43 | 11.16 | 10.82 | 11.02 |
| Tensile Strength at Break (Newton/$mm^2$) | 10 | 11.40 | 10.98 | 11.52 |
| Elongation at Break (%) | 18.5 | 16.0 | 16.5 | 15.5 |
| Ratio Elastic Modulus/ Density ($10^8$ mm) | 1.39 | 1.86 | 1.71 | 1.92 |

EXAMPLE 2

This example shows that, using the same amount of blowing agent, the density of expanded isotactic polypropylene films containing an agent which improves the crystallization speed is lower than that of similar films obtained from isotactic polypropylene which does not contain such agent.

To prepare these films, 0.4% azodicarbonamide was used as blowing agent. The results are reported in Table III.

TABLE III

| Polypropylene Grade | Density ($10^{-6}$ $N/mm^3$) |
| --- | --- |
| P1 | 6.62 |
| P2 | 4.92 |
| P3 | 5.93 |
| P4 | 5.89 |

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. Films made of expanded polypropylene characterized by having (i) a uniform specific gravity d of from about $4.25 \times 10^{-6}$ to about $6.50 \times 10^{-6}$ Newton/mm$^3$, (ii) a crystallization temperature of from about 115° C. to about 135° C., and (iii) an elastic modulus Me expressed in Newton/mm$^2$ such that the ratio Me:d is from about $1.6 \times 10^8$ to about $2.0 \times 10^8$ mm.

2. Films according to claim 1, characterized by having a crystallization temperature of from about 115° C. to about 130° C.

3. Films according to claim 1, having a density of from about $4.5 \times 10^{-6}$ to about $4.7 \times 10^{-6}$ N/mm$^3$.

4. Films according to claim 1 having a tensile strength at 5% elongation of from about 10.75 to about 11.25 N/mm$^2$.

5. Films according to claim 1 having a tensile strength at break of from about 11.0 to about 11.5 N/mm$^2$.

6. Expanded polypropylene films of claim 1 obtained from a polymeric composition comprising:
   (a) isotactic polypropylene;
   (b) an agent for increasing the crystallization speed of said polymeric composition; and
   (c) a blowing agent.

7. The films of claim 6 wherein said polymeric composition further comprises a nucleating agent.

8. The films of claim 6 wherein the agent for increasing the crystallization speed is selected from the group consisting of dibenzilidene sorbitol, sodium bis (4-tert-butyl-phenol) phosphate, sodium benzoate, a mixture comprising a monocarboxylic aromatic acid or a polycarboxylic aliphatic acid and a silicate or an aluminosilicate of a metal of Group I or II of the Periodic System, and any mixture thereof.

9. The films of claim 8 wherein said agent is present in an amount of from about 500 ppm to about 5000 ppm based on the weight of polypropylene.

10. The films of claim 6 wherein the isotactic polypropylene is selected from the group consisting of propylene homopolymer, a copolymer of propylene and not greater than 10 wt. % of an alpha-olefin having up to 6 carbon atoms, or any mixture thereof.

11. The films of claim 6 characterized by having a variation in density of less than 5%.

12. Films according to claim 6 having a tensile strength at 5% elongation of from about 10.75 to about 11.25 N/mm$^2$.

13. Films according to claim 6 having a tensile strength at break of from about 11.0 to about 11.5 N/mm$^2$.

* * * * *

UNITED STATES PATENT AND TRADEMARK OFFICE
CERTIFICATE OF CORRECTION

PATENT NO. : 4,638,015

DATED : January 20, 1987

INVENTOR(S) : Jean-Noel M. Bertrand

It is certified that error appears in the above-identified patent and that said Letters Patent is hereby corrected as shown below:

The term of this patent subsequent to March 17, 2004 has been disclaimed.

Signed and Sealed this

Thirteenth Day of October, 1987

*Attest:*

DONALD J. QUIGG

*Attesting Officer*   *Commissioner of Patents and Trademarks*